Patented Feb. 16, 1943

2,311,554

UNITED STATES PATENT OFFICE 2,311,554

WATER-DISPERSIBLE FAT-SOLUBLE VITAMIN COMPOSITION AND PROCESS OF PREPARING THE SAME

Sol T. Lipsius, Newark, N. J., assignor to National Oil Products Company, Harrison, N. J., a corporation of New Jersey No Drawing. Application July 7, 1939,
Serial No. 283,139

12 Claims. (Cl. 167—81)

This invention relates to vitamin compositions, more particularly to fat-soluble vitamin compositions, and to a process of preparing the same.

Fat-soluble vitamin concentrates, e. g., vitamins A, D, E and K concentrates, are generally sold in the form of solutions thereof in the oils in which they naturally occur or in other oils. Such solutions of the fat-soluble vitamins, however, cannot advantageously be added to aqueous media since they are generally immiscible therewith; this property is disadvantageous since it is highly desirable to incorporate fat-soluble vitamin concentrates in aqueous products such as milk, tonics and the like. Furthermore, if the natural oils in which the vitamins occur are employed as solvents, the solutions may have disagreeable tastes and odors.

It is the object of this invention to provide fat-soluble vitamin compositions which may be easily dispersed in aqueous media and used to advantage in the preparation of foodstuffs and the like.

It is a further object of this invention to provide dispersions of fat-soluble vitamins in aqueous media which are highly stable at elevated temperatures.

I have found that solutions of fat-soluble vitamin concentrates in ethyl alcohol containing a substance selected from the group consisting of the alcohol-soluble portions of edible gums may be easily dispersed in aqueous media so as to produce relatively clear dispersions of high vitamin potencies without any substantial separation of the oily vitamin concentrate. The ethyl alcohol solutions of my invention may be permitted to stand for long periods of time without substantial deterioration in the vitamin potencies of the solutions; this property of the solutions is highly desirable since they may be stored and shipped as desired without danger of a substantial deterioration in their vitamin potencies. Aqueous dispersions of the fat-soluble vitamin concentrates may be prepared by merely mildly agitating the alcohol solutions with an aqueous body for a short time. These dispersions are capable of standing for long periods of time without breaking and are suitable for a wide variety of purposes, particularly in the manufacture of vitamin-containing foodstuffs. These dispersions are particularly stable at elevated temperatures, e. g., temperatures about the boiling point of water; this factor is of great advantage in the preparation of many food products since it permits the fat-soluble vitamins to be readily incorporated in food products during cooking or other high temperature operations. Furthermore, my invention permits the production of dispersions of fat-soluble vitamin concentrates having potencies somewhat higher than similar dispersions produced from the same concentrates by the process of the application hereinabove mentioned. My invention is particularly applicable to the preparation of dispersions from high potency fat-soluble vitamin concentrates from which the portion insoluble in methanol at relatively low temperatures has been removed, since I have found that these concentrates yield solutions which can be dispersed in aqueous bodies with great ease to give highly desirable fortified products. However, it is to be understood that my invention is not limited to the treatment of such high potency concentrates, but is applicable to the treatment of all fat-soluble vitamin concentrates which are substantially soluble in ethyl alcohol.

The fat-soluble vitamin concentrates treated in accordance with my invention may be a vitamin A, D, E or K concentrate or a provitamin A concentrate which is substantially soluble in ethyl alcohol. Thus, for example, vitamin A concentrates containing from about 300,000 to about 2,500,000 A units per gram, preferably from about 750,000 to about 2,500,000 A units per gram, and vitamin D concentrates containing from about 100,000 to about 2,000,000 D units per gram, preferably from about 500,000 to about 2,000,000 D units per gram, may be employed. Mixed A and D concentrates containing from about 800,000 to about 1,800,000 A units per gram and from about 100,000 to about 1,400,000 D units per gram may also be treated. These concentrates may be prepared in any suitable manner; for example, vitamin A or D concentrates prepared from fish oils, carotene concentrates and D concentrates obtained by irradiating or otherwise activating sterols, e. g., cholesterol, ergosterol or 7-dehydro cholesterol, may be employed. Preferably, the vitamin concentrates treated in accordance with my invention are prepared by saponification of fish liver oils and extraction of the unsaponified portion with a suitable solvent, since these concentrates are relatively inexpensive and form excellent dispersions in aqueous media when employed in the practice of my invention. As above mentioned, it is preferred to employ high potency fat-soluble vitamin concentrates from which the portion insoluble in methanol at relatively low temperatures has been removed; such high potency concentrates may be obtained by dissolving a fat-soluble vitamin concentrate in methanol at room temperature, then cooling the solution to about −20° C. and separating the insoluble portion from the solution.

The edible gum employed to yield the alcohol-soluble portion thereof for use in accordance with my invention may be any of the edible gums well known to the art; thus gums such as gum arabic, gum tragacanth, gum suakin, gum senegal, wattle gum, cape gum, agar-agar, Irish moss gum, sugar beet gum, etc. may be used. I prefer to employ gum tragacanth or gum arabic because of the excellent dispersions obtained when using the alcohol-soluble portions of these gums, and because of their ready availability and comparative cheapness.

In carrying out my invention a solution of a fat-soluble vitamin concentrate in a solvent comprising ethyl alcohol and the alcohol-soluble portion of an edible gum is first prepared. This solution may be made in a variety of ways. For example, a fat-soluble vitamin concentrate may be dissolved in ethyl alcohol and the alcohol-soluble portion of an edible gum then added to the solution thus formed; or a solution containing the alcohol soluble portion of an edible gum dissolved in ethyl alcohol may first be prepared and the concentrate then dissolved therein. Preferably, this solution is prepared by refluxing an edible gum with a suitable amount of ethyl alcohol until the alcohol-soluble portion of the gum has been extracted, removing the alcohol-insoluble portion of the gum from the alcohol and dissolving a fat-soluble vitamin concentrate in the solution thus formed.

The amount of the edible gum refluxed with the alcohol in accordance with the preferred embodiment of my invention may vary, depending to some extent upon the particular gum employed. For example, I have found that the alcohol-soluble portions of gum tragacanth and gum arabic have more effective dispersing actions than the alcohol-soluble portions of other edible gums, so that comparatively small amounts of these gums may be used in accordance with the preferred embodiment of my invention. Generally between about 1 and about 10 parts of an edible gum may be refluxed with between about 20 and about 200 parts of ethyl alcohol, the specific amounts depending upon the above mentioned factors, for a time sufficient to extract substantially all the alcohol-soluble portion of the gum.

The amount of fat-soluble vitamin concentrate dissolved in the solution containing ethyl alcohol and the alcohol-soluble portion of an edible gum prepared as hereinabove described may vary widely depending to some extent upon the potency of the particular concentrate employed. I have found that it is generally desirable to produce alcohol solutions containing from about 1,000 to about 150,000 A units per gram or about 200,000 or less D units per gram; solutions containing both vitamin A and vitamin D in amounts within the above ranges may also be prepared. In order to effect the production of such solutions an amount of a fat-soluble vitamin concentrate sufficient to yield an alcoholic solution containing from about 0.5% to about 12%, preferably from about 0.5% to about 9%, of the concentrate may be added to the alcoholic solution. The concentrate may be dissolved in the solution in any suitable manner; preferably, solution is effected by mildly agitating the concentrate with the alcohol-gum solution at room temperature until the concentrate is substantially completely dissolved. The solution of the concentrate may be filtered, if desired, to remove any sediment which separates during its preparation or subsequent storage. The alcoholic solutions of the fat-soluble vitamin concentrates thus prepared are brilliantly clear and may be stored and shipped as desired without substantial deterioration of their vitamin potencies provided excessive access of air and sunlight is avoided.

It is also within the scope of my invention to include in the alcohol solutions of the vitamin concentrates suitable amounts of other substances having beneficial effects upon the aqueous bodies to which the alcoholic solutions may ultimately be added; thus, for example, vitamins $B_1$, C and G may be incorporated in the alcohol solutions if desired. It may also be desirable to incorporate antioxidants such as hydroquinone in the alcoholic solutions.

The alcoholic solutions prepared as above described may then be mixed with aqueous bodies to produce dispersions of the fat-soluble vitamin concentrates in aqueous media. Thus these solutions may be added to aqueous bodies such as water, to aqueous food products such as milk, coffee, tea, etc., and to aqueous medicinal preparations such as tonics, pharmaceuticals and the like, to form stable products fortified with the fat-soluble vitamins. I have found that in order to produce such fortified products, it is merely necessary to add the alcoholic solutions gradually to the aqueous bodies with mild agitation, whereby the vitamin concentrates are dispersed in the alcohol-water media; for example, an alcoholic solution prepared as above described may be added dropwise with mild agitation to water, milk, coffee, tonics, pharmaceuticals and the like, either just prior to consuming the products or at any other suitable time. In practically every case the addition of the alcoholic solutions causes the immediate formation of dispersions of the concentrates without any substantial separation of the oily concentrates. These dispersions formed with aqueous bodies are substantially permanently stable so that the fortified products may be stored and shipped if desired.

The amount of the alcoholic solution of the fat-soluble vitamin concentrate added to an aqueous body in accordance with my invention may vary widely depending upon the potency of the alcoholic solution, the quantity of the aqueous body to be fortified and the number of vitamin units it is desired to incorporate in the aqueous body. In some cases it may be desirable to first dilute the alcoholic solution with additional quantities of alcohol in order to permit more accurate regulation of the quantity of vitamin concentrate added. As a general rule a dosage of about 10,000 A units and 1,000 D units per day per individual is appropriate. It is a simple matter, once the potencies of the alcoholic solutions of the vitamin concentrates are determined, to regulate the amounts of the alcoholic solutions of the concentrates which should be added to the aqueous bodies in order to effect the production of fortified products having A and D potencies such that the users of these products will ingest approximately the proper amounts of vitamins.

The dispersions of the fat-soluble vitamins prepared in accordance with my invention possess the outstanding property of being stable at elevated temperatures, e. g., temperatures about the boiling point of water. These dispersions do not break when heated to such temperatures but actually tend to become more stable. This property of these dispersions is particularly advantageous since it permits them to be incorporated in food products at elevated temperatures without substantial danger of the dispersions breaking and thereby causing the valuable vitamin concentrates to separate. However, it should be noted that prolonged heating of the dispersions may cause the vitamins contained therein, particularly vitamin A, to deteriorate so that it is not advisable to heat these dispersions for extended periods of time.

The following examples are illustrative of my invention. Amounts are given in parts by weight.

Example I 5 parts of gum tragacanth were added to 100 parts of ethyl alcohol, the mixture refluxed for one hour and filtered to remove the insoluble residue. 5 parts of a vitamin A concentrate containing 780,000 A units per gram were then dissolved in the alcohol solution, whereby a brilliantly clear solution was formed. This solution contained about 37,000 A units per gram. It was mildly agitated with about 1,000 parts of water, whereby a stable, homogeneous dispersion containing 3,410 A units per gram was obtained. This dispersion was heated to boiling without breaking.

Example II 5 parts of gum tragacanth and 5 parts of gum arabic were added to 100 parts of ethyl alcohol, the mixture refluxed for one hour and then filtered to remove the insoluble residue. 5 parts of a vitamin A concentrate containing 780,000 A units per gram were dissolved in the alcohol solution, whereby a brilliantly clear solution was obtained. This solution contained about 36,500 A units per gram. It was mildly agitated with about 1,000 parts of water, whereby a stable, homogeneous dispersion was formed. This dispersion contained about 3,360 A units per gram. It was heated to boiling without breaking.

Example III 27 parts of gum tragacanth were added to 630 parts of ethyl alcohol, the mixture refluxed for about one hour and filtered to remove the insoluble residue. 50 parts of a vitamin A concentrate containing 788,000 A units per gram and about 10,000 D units per gram and 3 parts of a concentrate containing 682,000 A units per gram and 1,000,000 D units per gram were then dissolved in the alcohol solution, whereby a brilliantly clear solution was obtained. This solution had a vitamin A content of about 61,000 A units per gram and a vitamin D content of 5,250 D units per gram. It was mildly agitated with about 3,400,000 parts of milk, whereby a stable, homogeneous fortified milk product was obtained; this product had a vitamin A content of about 12.2 A units per gram and a vitamin D content of about 1.1 D units per gram.

Example IV 50 parts of gum tragacanth were added to 940 parts of ethyl alcohol, the mixture refluxed for about one hour and filtered to remove the insoluble residue. 53 parts of a vitamin A concentrate containing about 700,000 A units per gram and about 10,000 D units per gram and 9.5 parts of a vitamin D concentrate containing 1,000,000 D units per gram and 688,000 A units per gram were then dissolved in the alcohol solution, whereby a brilliantly clear solution was obtained. The solution had a vitamin A content of about 43,500 A units per gram and a vitamin D content of about 10,000 D units per gram. 2 parts of thiamine hydrochloride were then dissolved in this solution. The resulting solution was mildly agitated with 100,000 parts of water, whereby a stable, homogeneous dispersion was obtained having a vitamin A content of about 43 A units per gram and a vitamin D content of about 9.9 D units per gram.

It will be evident from the above description that my invention provides a process for obtaining clear and substantially permanently stable solutions of the fat-soluble vitamin concentrates which may be readily dispersed in aqueous bodies to produce stable, homogeneous dispersons of the concentrates. My invention is particularly applicable to the incorporation of fat-soluble vitamins in food products and medicinal preparations since the aqueous dispersions of the concentrates may be readily incorporated into edible products. Therefore, it is evident that my invention will be of great interest to those engaged in the manufacture of vitamin-containing materials.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent, is:

1. A readily water-dispersible composition of matter comprising a solution of a fat-soluble vitamin concentrate in ethyl alcohol, said solution containing a relatively small amount of only the ethanol-soluble portion of an edible gum.

2. A readily water-dispersible composition of matter comprising a solution of a vitamin A concentrate in ethyl alcohol, said solution containing a relatively small amount of only the ethanol-soluble portion of an edible gum.

3. A readily water-dispersible composition of matter comprising a solution of a vitamin D concentrate in ethyl alcohol, said solution containing a relatively small amount of only the ethanol-soluble portion of an edible gum.

4. A readily water-dispersible composition of matter comprising a solution of a fat-soluble vitamin concentrate in ethyl alcohol, said solution containing a relatively small amount of only the ethanol-soluble portion of gum tragacanth.

5. A process for preparing stable, fat-soluble vitamin compositions capable of being readily dispersed in aqueous bodies which comprises refluxing an edible gum with ethyl alcohol, removing the alcohol-insoluble portion of the gum from the alcohol and dissolving in this solution a fat-soluble vitamin concentrate.

6. A readily water-dispersible composition of matter comprising a solution of a fat-soluble vitamin concentrate in ethyl alcohol and a water-soluble vitamin, said solution containing a relatively small amount of only the ethanol-soluble portion of an edible gum.

7. A readily water-dispersible composition of matter comprising a solution of vitamins A, $B_1$, C, D and G in ethyl alcohol, said solution containing a relatively small amount of only the ethanol-soluble portion of an edible gum.

8. A readily water-dispersible composition of matter comprising a solution of a fat-soluble vitamin concentrate in ethyl alcohol, said solution containing a relatively small amount of only the ethanol-soluble portion of gum arabic.

9. A readily water-dispersible composition of matter comprising a solution of a fat-soluble vitamin in ethyl alcohol and a water-soluble vitamin, said solution containing a relatively small amount of only the ethanol-soluble portion of gum tragacanth.

10. A readily water-dispersible composition of matter comprising a solution of a fat-soluble vitamin in ethyl alcohol and a water-soluble vitamin, said solution containing a relatively small amount of only the ethanol-soluble portion of gum arabic.

11. A composition of matter comprising an ethyl alcohol solution of a fat-soluble vitamin and only the ethanol-soluble portion of an edible gum, said solution being dispersed in an aqueous medium.

12. A composition of matter comprising an ethyl alcohol solution of a fat-soluble vitamin, a water-soluble vitamin, and only the ethanol-soluble portion of an edible gum, said solution being dispersed in an aqueous medium.

SOL T. LIPSIUS.